United States Patent
Yamamoto et al.

(10) Patent No.: US 8,867,152 B2
(45) Date of Patent: Oct. 21, 2014

(54) OPTICAL BARREL AND OPTICAL APPARATUS

(71) Applicant: Canon Kabushiki Kaisha, Tokyo (JP)

(72) Inventors: Harushige Yamamoto, Yamato (JP); Kousuke Kiyamura, Kawasaki (JP); Mitsuhiro Izumi, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/719,448

(22) Filed: Dec. 19, 2012

(65) Prior Publication Data
US 2013/0163107 A1    Jun. 27, 2013

(30) Foreign Application Priority Data
Dec. 22, 2011    (JP) .................. 2011-280742

(51) Int. Cl.
*G02B 7/02* (2006.01)
*G02B 15/14* (2006.01)
*G03B 17/00* (2006.01)
*G03B 21/14* (2006.01)
*G02B 7/10* (2006.01)

(52) U.S. Cl.
CPC . *G02B 7/02* (2013.01); *G02B 7/102* (2013.01)
USPC .............. 359/828; 359/699; 396/79; 353/101

(58) Field of Classification Search
CPC ............ G02B 7/02; G02B 15/14; G02B 7/10; G02B 7/102; G02B 7/021; G02B 23/125; G02B 7/023; G02B 7/04; G02B 7/08; G02B 7/026
USPC ......... 359/828, 699–701, 694, 696, 703–704, 359/811, 813, 815, 819, 822–823, 824–827, 359/829–830; 396/79, 83; 353/101; 350/429, 521, 522, 530, 556; 348/345, 348/375–376
See application file for complete search history.

(56) References Cited

U.S. PATENT DOCUMENTS 4,834,514 A * 5/1989 Atsuta et al. .................. 359/699

FOREIGN PATENT DOCUMENTS

JP    09-211533 A    8/1997

* cited by examiner

*Primary Examiner* — Dawayne A Pinkney
(74) *Attorney, Agent, or Firm* — Rossi, Kimms & McDowell LLP

(57) ABSTRACT

The optical barrel includes a first barrel member having a guiding portion to guide an optical element holding member in an optical axis direction, and a second barrel member disposed around the first barrel member and being relatively rotatable with the first barrel member. The second barrel member is provided with a cam portion to move the holding member, and with a bayonet engagement portion in an outer circumferential portion of the second barrel member. The first barrel member is provided with a flange portion, and with overhang portions and bayonet protrusion portions in plural areas of the flange portion. Each overhang portion extends along an outer circumferential surface of the second barrel member in the optical axis direction. Each bayonet protrusion portion extends inward in the radial direction and engaging with the bayonet engagement portion.

4 Claims, 4 Drawing Sheets

OPTICAL BARREL AND OPTICAL APPARATUS

BACKGROUND OF THE INVENTION

1. Field of the Invention

The present invention relates to an optical barrel provided in optical apparatuses such as video cameras and digital still cameras and operable to move an optical element such as a lens in an optical axis direction.

2. Description of the Related Art

Some of optical barrels have a bayonet coupling configuration in which, as disclosed in Japanese Patent No. 3559639, guiding protrusion portions provided in an outer circumferential part of a straight guiding barrel as a first barrel member engage with a circumferentially extending groove portion (hereinafter referred to as "a circumferential groove portion") formed in an inner circumferential surface of a cam barrel as a second barrel member disposed around the straight guiding barrel. Such a bayonet coupling configuration makes the straight guiding barrel and the cam barrel relatively rotatable with each other around an optical axis (that is, in a circumferential direction). A cam follower provided in an optical element (actually in a holding member holding the optical element) engages with a straight groove portion (through groove portion) formed in the straight guiding barrel so as to extend in an optical axis direction and with a cam groove portion formed in the inner circumferential surface of the cam barrel. In this optical barrel, relative rotation of the straight guiding barrel and the cam barrel causes the cam portion having a cam lift to move the cam follower in the optical axis direction with guiding the cam follower in the same direction by the straight groove portion, and thereby the optical element (holding member) is moved in the optical axis direction.

Moreover, Japanese Patent No. 3559639 discloses an overhang portion provided in the straight guiding barrel so as to extend along an outer circumferential surface of the cam barrel in the optical axis direction (that is, so as to overhang the cam barrel). This overhang portion holds a driven part (slider) of a variable resistor to detect a position of the straight guiding barrel (focal length information) from output of the variable resistor.

However, it is necessary for the optical barrel disclosed in Japanese Patent No. 3559639 to avoid interference between the circumferential groove portion and the cam groove portion formed in the same inner circumferential surface of the cam barrel. In order to avoid this interference, it is in general necessary to divide the inner circumferential surface of the cam barrel in the optical axis direction into an area where the circumferential groove portion is formed and an area where the cam groove portion is formed, which increases length of the cam barrel in the optical axis direction and thereby increases size of the optical barrel and size of an optical apparatus provided therewith.

On the other hand, it is possible to reduce the length of the cam barrel by forming the circumferential groove portion so as to be divided in the circumferential direction at an area where the cam groove portion exists. However, in the area where the circumferential groove portion is divided (that is, where no circumferential groove portion is formed), the guiding protrusion portion of the straight guiding barrel does not engage with the circumferential groove portion, which generates backlash between the straight guiding barrel and the cam barrel in the optical axis direction or which inhibits smooth engagement of the guiding protrusion portion with a next circumferential groove portion in the circumferential direction and thereby may cause defective operation.

SUMMARY OF THE INVENTION

The present invention provides an optical barrel capable of reducing length of a second barrel member (for example, a cam barrel) in an optical axis direction and thereby capable of being miniaturized as a whole, and provides a compact optical apparatus provided therewith.

The present invention provides as one aspect thereof an optical barrel including a holding member holding an optical element and being movable in an optical axis direction, a first barrel member provided with a guiding portion to guide the holding member in the optical axis direction, and a second barrel member disposed around the first barrel member and being relatively rotatable in an circumferential direction with the first barrel member. The second barrel member is provided with a cam portion to move the holding member in the optical axis direction with relative rotation of the second barrel member with the first barrel member, and with a bayonet engagement portion in an outer circumferential portion of the second barrel member. The first barrel member is provided with a flange portion extending outward in a radial direction of the first barrel member, and with overhang portions and bayonet protrusion portions in plural areas of the flange portion in the circumferential direction, each overhang portion extending along an outer circumferential surface of the second barrel member in the optical axis direction, and each bayonet protrusion portion extending inward in the radial direction and engaging with the bayonet engagement portion of the second barrel member.

The present invention provides as another aspect thereof an optical apparatus including a body of the apparatus, and the above optical barrel provided in the body.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
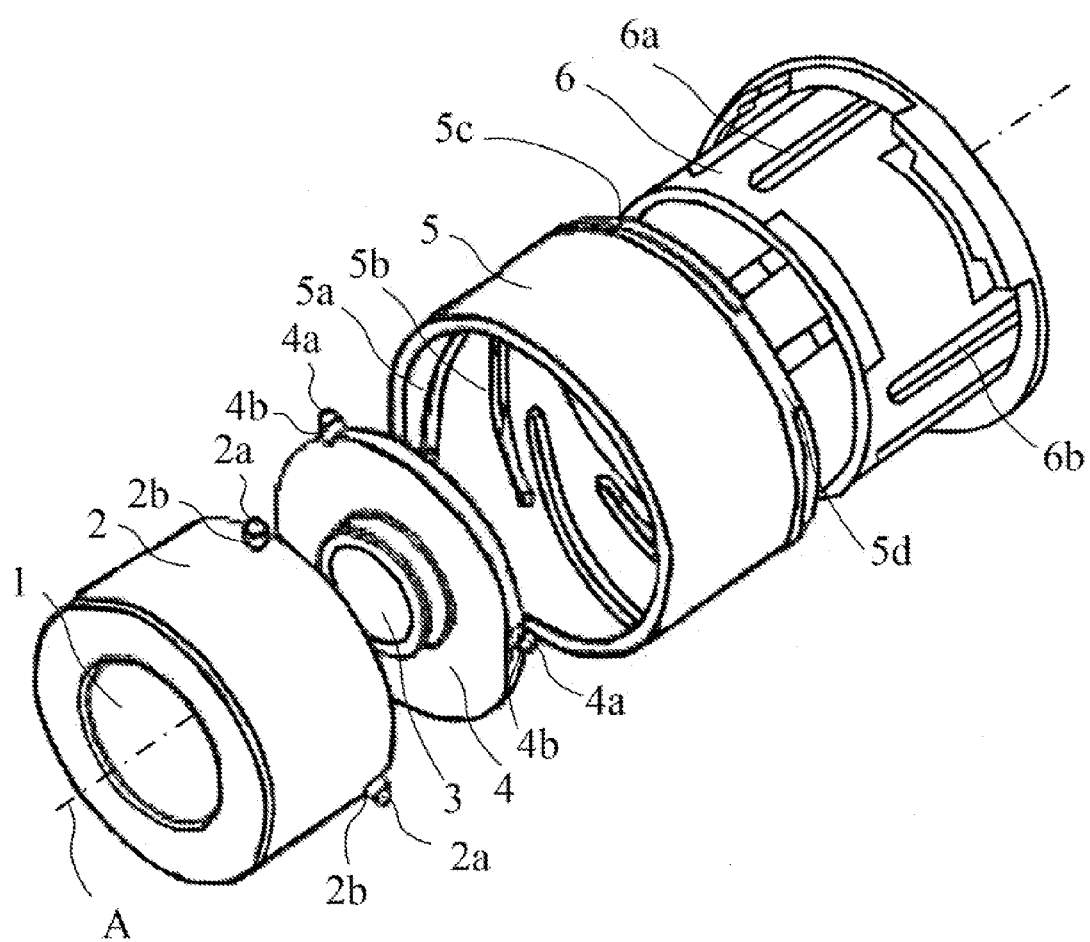
FIG. 1 is a perspective view showing a configuration of an optical barrel that is Embodiment 1 of the present invention.

FIG. 1 is an exploded view of an optical barrel (lens barrel) that is a first embodiment (Embodiment 1) of the present invention. Reference numeral 1 denotes a first lens group as an optical element that introduces light from an object to a second lens group 3 as another optical element. Reference numeral 2 denotes a first group lens barrel as a holding member that holds the first lens group 1. The first group lens barrel 2 is provided, at circumferential three places of its rear end part (image plane side end part), with cam followers 2a each having a truncated cone shape and engagement protrusion portions 2b each having a cylindrical shape such that one cam follower 2a and one engagement protrusion portion 2b are concentrically formed.

The second lens group 3 introduces the light from the first lens group 1 to a third lens group (not shown). The third lens group as a focus lens causes the light from the second lens group 3 to form an optical image on an image sensor (not shown). The first lens group 1, the second lens group 3 and the third lens group constitute an image capturing optical system. A direction in which an optical axis A of the image capturing optical system is referred to as "an optical axis direction. A direction orthogonal to the optical axis direction is referred to as "a radial direction", and a direction around the optical axis A is referred to as "a circumferential direction".

Reference numeral 4 denotes a second group holding frame that holds the second lens group 3. The second group holding frame 4 is provided, at circumferential three places in its outer circumferential surface, with cam followers 4a each having a truncated cone shape and engagement protrusion portions 4b each having a cylindrical shape such that one cam follower 4a and one engagement protrusion portion 4b are concentrically formed. The first group lens barrel 2 and the second group holding frame 4 are respectively movable in the optical axis direction. The second group holding frame 4 may be provided with an optical mechanism (not shown) such as a shutter mechanism or an image stabilizing (image blur correction) mechanism.

Reference numeral 5 denotes a cam barrel that is a second barrel member. The cam barrel 5 is provided, in its inner circumferential surface and in its circumferential direction, with three first group cam groove portions 5a that are cam portions to move the first group lens barrel 2 in the optical axis direction, and with three second group cam groove portions 5b that are cam portions to move the second group holding frame 4 in the optical axis direction. Moreover, the cam barrel 5 is provided, in circumferential plural areas (three areas in this embodiment) at a rear end part of its outer circumferential surface, with bayonet groove portions (circumferential groove portions) 5c as bayonet engagement portions extending in the circumferential direction of the cam barrel 5.

Figure 2:
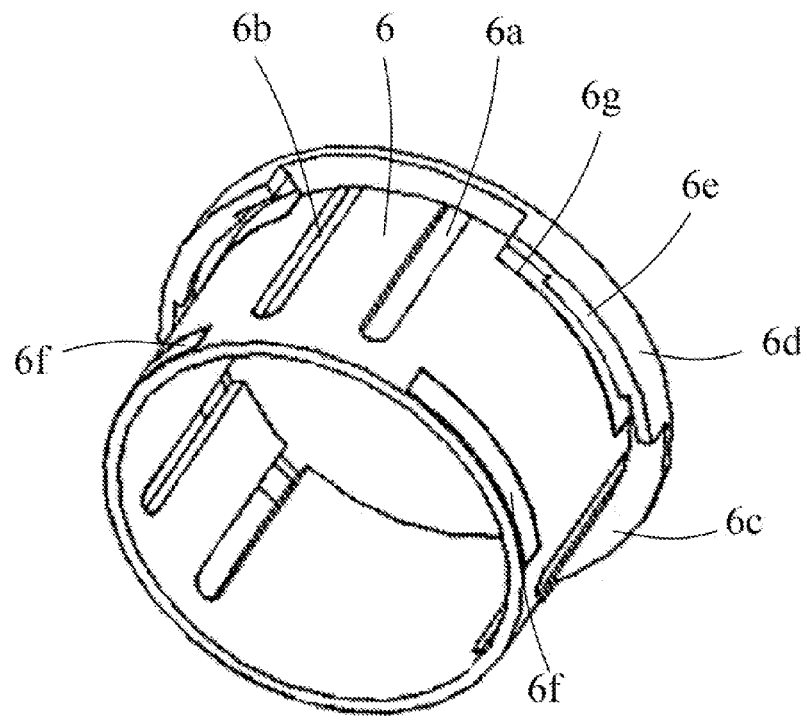
FIG. 2 is a perspective view of a straight guiding barrel constituting part of the optical barrel of Embodiment 1.

Reference numeral 6 denotes a straight guiding barrel that is a first barrel member. FIG. 2 is an enlarged view of the straight guiding barrel 6. The straight guiding barrel 6 is provided, in its circumferential direction, with three first straight guiding groove portions 6a as guiding portions that extend in the optical axis direction and guide the first group lens barrel 2 in the optical axis direction, and with three second straight guiding groove portions 6b as guiding portions that extend in the optical axis direction and guide the second group holding frame 4 in the optical axis direction. The first straight guiding groove portions 6a and the second straight guiding groove portions 6b are formed as openings penetrating through a circumferential wall of the straight guiding barrel 6. The above-mentioned cam barrel 5 is disposed around the circumferential wall of the straight guiding barrel 6. The straight guiding barrel 6 and the cam barrel 5 are relatively rotatable with each other.

Moreover, the straight guiding barrel 6 is provided, at a rear end of its outer circumferential part, with a flange portion 6c extending outward in the radial direction and extending in the circumferential direction. In circumferential plural areas (three areas in this embodiment) of the flange portion 6c, overhang portions 6d extending forward in the optical axis direction. The overhang portions 6d extend along the outer circumferential surface of the cam barrel 5 disposed around the straight guiding barrel 6. That is, the overhang portions 6d overhang the cam barrel 5.

In addition, at front ends of the three overhang portions 6d, bayonet claw portions (bayonet protrusion portions) 6e extending inward in the radial direction and extending in the circumferential direction.

The straight guiding barrel 6 is assembled to the cam barrel 5 by matching phase of the three bayonet claw portions 6e with that of grooves 5d among the three bayonet groove portions 5c, by passing the bayonet claw portions 6e through the grooves 5d and then by relatively rotating the cam barrel 5 and the straight guiding barrel 6 such that the bayonet claw portions 6e are inserted into the bayonet groove portions 5c. Thereby, front and rear surfaces of each bayonet groove portion 5c engage with each bayonet claw portion 6e in the optical axis direction.

Figure 5:
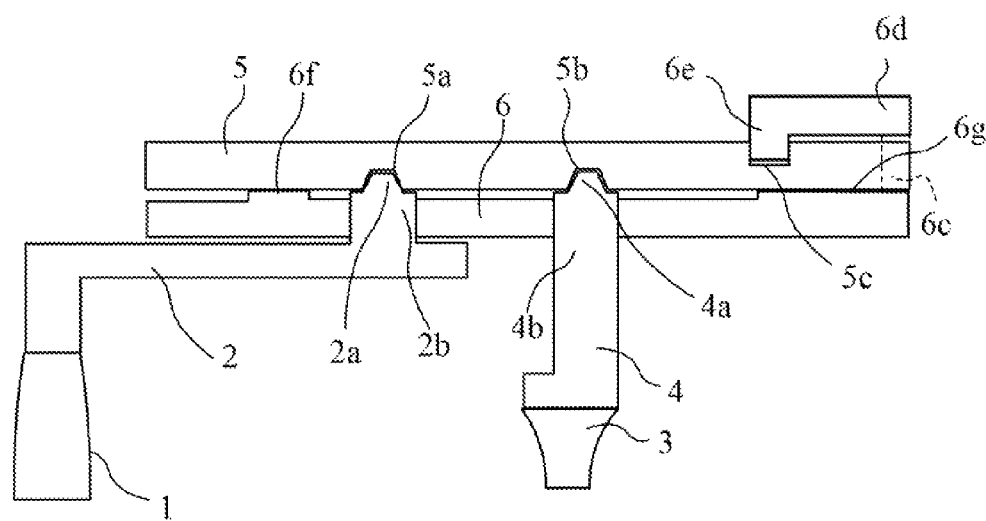
FIG. 5 is a cross-sectional view of part of the optical barrel of Embodiment 1.

FIG. 5 shows a cross-section of the cam barrel 5 and the straight guiding barrel 6 thus assembled. Engagement of the bayonet groove portion 5c with the bayonet claw portions 6e in the optical axis direction allows relative rotation of the cam barrel 5 and the straight guiding barrel 6 while preventing their displacement in the optical axis direction.

Moreover, the first group lens barrel 2 and the second group holding frame 4 are inserted inside the straight guiding barrel 6 assembled to the cam barrel 5. With this insertion, the three cam followers 2a of the first group lens barrel 2 engage with the three first group cam groove portions 5a of the cam barrel 5, and the three cam followers 4a of the second group holding frame 4 engage with the three second group cam groove portions 5b of the cam barrel 5. Furthermore, the three engagement protrusion portions 2b of the first group lens barrel 2 engage with the three first straight guiding groove portions 6a of the straight guiding barrel 6, and the three engagement protrusion portions 4b of the second group holding frame 4 engage with the three second straight guiding groove portions 6b of the straight guiding barrel 6.

In this assembled state, the cam barrel 5 is rotated by an actuator (not shown) such as a stepping motor. Thereby, the first group lens barrel 2 and the second group holding frame 4 are respectively moved by cam lifts of the first group cam groove portions 5a and cam lifts of the second group cam groove portions 5b with being guided by the first and second straight guiding groove portions 6a and 6b. Thus, zooming of the image capturing optical system is performed.

In FIG. 2, reference numeral 6f denotes three first receiving portions formed in circumferential three front side areas on an outer circumferential surface of the straight guiding barrel 6 so as to protrude from that outer circumferential surface. Moreover, reference numeral 6g denotes three second receiving portions formed in circumferential three rear side areas on the outer circumferential surface of the straight guiding barrel 6 so as to protrude from that outer circumferential surface. The plural (three) first receiving portions 6f and the plural (three) second receiving portions 6g serve as surfaces to receive and support the inner circumferential surface of the came barrel 5.

Actually, the first and second receiving portions 6f and 6g were formed as diameter correction portions to improve accuracy of diameter of the outer circumferential surface of the straight guiding barrel 6 with respect to diameter of the inner circumferential surface of the cam barrel 5 when the straight guiding barrel 6 was formed by using a mold. The first and second receiving portions 6f and 6g have a protruding amount of about 0.3 mm with respect to the outer circumferential surface of the straight guiding barrel 6.

When manufacturing the mold, a straight guiding barrel as a sample is formed by using the mold, and the mold is adjusted based on actually measured dimensions of the sample so as to increase the accuracy of the diameter of the outer circumferential surface of the straight guiding barrel 6 with respect to the diameter of the inner circumferential surface of the cam barrel 5. The diameter correction portion is a result of the adjustment of the mold, and makes it possible to almost eliminate engagement backlash between the straight guiding member 6 and the cam barrel 5 in the radial direction.

Figure 3:
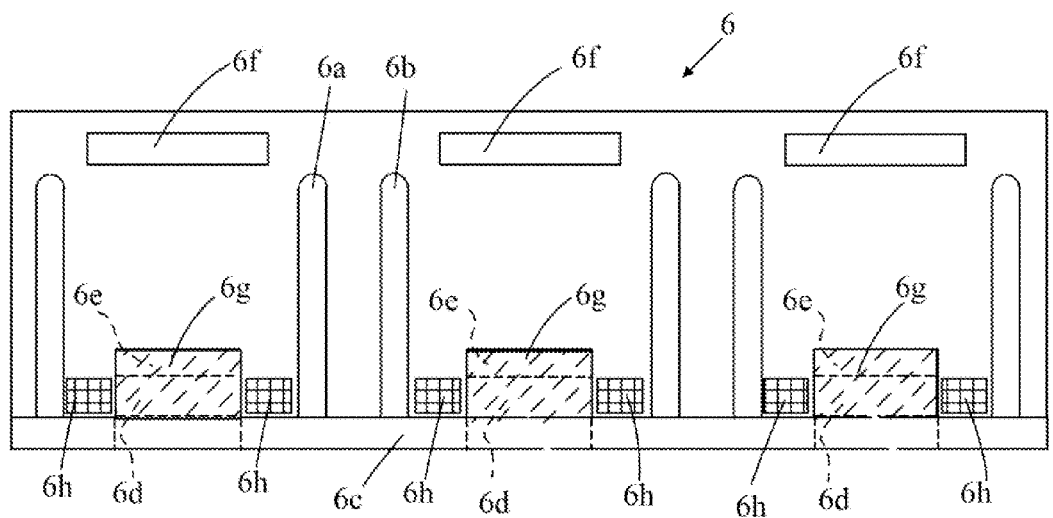
FIG. 3 is a development view of the straight guiding barrel.

FIG. 3 shows the outer circumferential surface of the straight guiding barrel 6 developed in a plane. FIG. 3 shows the second receiving portions (at least one of the plural receiving portions) 6g as hatched portions. As understood from FIG. 3, each of the second receiving portions 6g is formed in an area overlapping the above-mentioned overhang portion 6d and the bayonet claw portion 6e in the radial direction. In other words, the second receiving portion 6g is formed in an area where the overhang portion 6d and the bayonet claw portion 6e are projected from an outside in the radial direction onto the outer circumferential surface of the straight guiding barrel 6. The reasons therefor are as follows.

Figure 4:
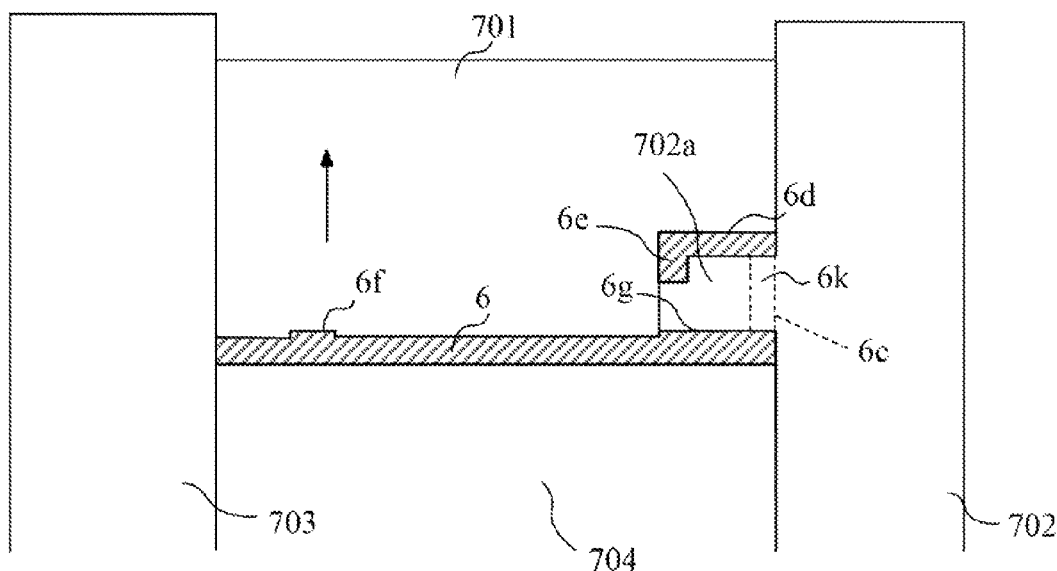
FIG. 4 shows a configuration of a mold used for forming the straight guiding barrel.

FIG. 4 shows a configuration of a mold to form the straight guiding barrel 6 with injection molding. Reference numeral 701 denotes an outer circumferential slide mold to form the outer circumferential surface of the straight guiding barrel 6, the flange portion 6c, outer circumferential surfaces of the overhang portions 6d, front end surfaces of the bayonet claw portions 6e and the first receiving portions 6f. The outer circumferential slide mold 701 is separated from the straight guiding barrel 6 outward in the radial direction.

Reference numeral 703 denotes a movable (or fixed) mold to form a front end surface of the straight guiding barrel 6, and is separated away from the straight guiding barrel 6 in the optical axis direction. Reference numeral 702 denotes a fixed (or movable) mold to form a rear end surface of the straight guiding barrel 6 and has protrusion portions 702a to form inner circumferential surfaces of the overhang portions 6d, rear end surfaces and inner circumferential surfaces of the bayonet claw portions 6e and the second receiving portions 6g. The mold 702 is separated from the straight guiding barrel 6 in the optical axis direction. After separation of the mold 702 from the straight guiding barrel 6, an opening 6k penetrating through the flange portion 6c in the optical axis direction, which was formed by the protrusion portion 702a, remains in a more inner part of the flange portion 6c than the overhang portion 6d. Reference numeral 704 denotes a mold to form an inner circumferential surface of the straight guiding barrel 6, which is separated from the straight guiding barrel 6 in the optical axis direction.

If the second receiving part 6g is formed by the outer circumferential slide mold 701, it is necessary to dispose the second receiving parts 6g in meshed areas 6h shown in FIG. 3. However, disposing the second receiving parts 6g in the meshed areas 6h makes it impossible to acquire, in a rear end side area of the inner circumferential surface of the cam barrel 5, a sufficient area in contact with the straight guiding barrel 6, which makes it impossible to ensure stable relative rotation of the cam barrel 5 and the straight guiding barrel 6. For example, when the cam groove portion formed in the inner circumferential surface of the cam barrel 5 faces the area 6h, the second receiving portion 6g formed in this area 6h gets stuck into the cam groove portion, which generates engagement backlash between the straight guiding barrel and the cam barrel 5 in the radial direction or inhibits smooth relative rotation thereof.

Moreover, it is possible to form the second receiving part 6g on a more front side than the overhang portion 6d in order to acquire a sufficient area in contact with the straight guiding barrel 6. However, this configuration reduces a distance in the optical axis direction between the second receiving portion 6g and the first receiving portion 6f, which may cause a tilt of the cam barrel 5 with respect to the straight guiding barrel 6. Such a tilt causes a tilt of the first and second lens groups 1 and 3 with respect to the optical axis and the like, which reduces optical performance.

Therefore, this embodiment employs the above-described configuration in which the second receiving portion 6g is formed in the area overlapping the overhang portion 6d and the bayonet claw portion 6e in the radial direction, by using the mold 702 that can be separated from the straight guiding barrel 6 in the optical axis direction. This configuration makes it possible to eliminate engagement backlash between the straight guiding barrel 6 and the cam barrel 5 in the radial direction, to ensure smooth relative rotation thereof, and to achieve high optical performance.

Embodiment 2

Figure 6:
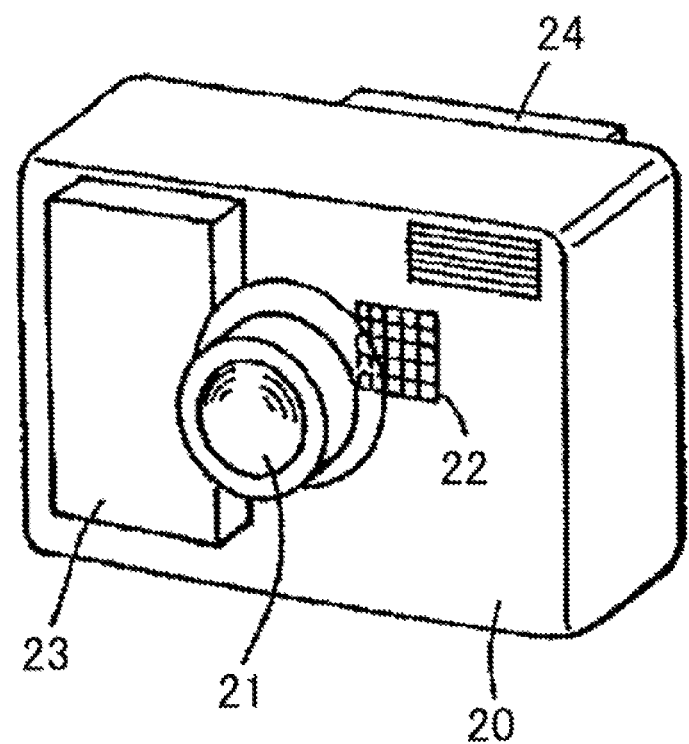
FIG. 6 is a schematic view of an optical apparatus (image pickup apparatus) that is Embodiment 2 of the present invention, the optical apparatus being provided with the optical barrel of Embodiment 1.

FIG. 6 shows a digital still camera (image pickup apparatus as one of optical apparatuses) that is a second embodiment of the present invention, using the optical barrel of Embodiment 1.

In FIG. 6, reference numeral 20 denotes a camera body, 21 an image capturing optical system included in the optical barrel of Embodiment 1, and 22 an image sensor (photoelectric conversion element) such as a CCD sensor or a CMOS sensor. The image sensor 22 is provided in the camera body 20 and photoelectrically converts an object image formed by the image capturing optical system 21.

Reference numeral 23 denotes a memory to record image information corresponding to the object image photoelectrically converted by the image sensor 22, and 24 a viewfinder constituted by a liquid crystal display panel or the like and allowing a user to observe the object image formed on the image sensor 22.

The optical barrel of Embodiment 1 thus used for the image pickup apparatus enables achievement high optical performance of the image pickup apparatus.

Although this embodiment described the image pickup apparatus using the optical barrel of Embodiment 1, alternative embodiments of the present invention include other optical apparatuses than the image pickup apparatus, such as interchangeable lenses and observation apparatuses (such as binoculars and telescopes).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-280742, filed on Dec. 22, 2011, which is hereby incorporated by reference herein in its entirety.

What is claimed is:

1. An optical barrel comprising:
 a holding member holding an optical element and movable in an optical axis direction;
 a first barrel member having a guiding portion to guide the holding member in the optical axis direction; and
 a second barrel member disposed around the first barrel member and relatively rotatable in a circumferential direction with the first barrel member, wherein the second barrel member has (a) a cam portion to move the holding member in the optical axis direction with relative rotation of the second barrel member with the first barrel member and (b) a bayonet engagement portion in an outer circumferential portion of the second barrel member, wherein the first barrel member has (a) a flange portion extending outward in a radial direction of the first barrel member and (b) overhang portions and bayonet protrusion portions in plural areas of the flange portion in the circumferential direction, wherein each of the overhang portions extends along an outer circumferential surface of the second barrel member in the optical axis direction, wherein each of the bayonet protrusion portions extend inward in the radial direction and engages the bayonet engagement portion of the second barrel member, wherein the first barrel member has, on an outer circumferential surface of the first barrel member, a first receiving portion and a second receiving portion separated from each other in the optical axis direction, wherein each of the first and second receiving portions protrudes from the outer circumferential surface of the first barrel member in the radial direction and is configured to make contact with an inner circumferential surface of the second barrel member, and wherein the second receiving portion is disposed in an area on the outer circumferential surface of the first barrel member overlapping the overhang portion in the radial direction.

2. An optical barrel according to claim 1, wherein the first and second receiving portions serve as diameter correction portions when the first barrel member is formed using a mold.

3. An optical barrel according to claim 1, wherein the flange portion is disposed, in the plural areas thereof where the overhang portions and the second receiving portion are disposed, with openings penetrating through in the optical axis direction.

4. An optical apparatus comprising:
a body; and
an optical barrel provided in the body and including:
a holding member holding an optical element and movable in an optical axis direction;
a first barrel member having a guiding portion to guide the holding member in the optical axis direction; and
a second barrel member disposed around the first barrel member and relatively rotatable in a circumferential direction with the first barrel member, wherein the second barrel member has (a) a cam portion to move the holding member in the optical axis direction with relative rotation of the second barrel member with the first barrel member and (b) a bayonet engagement portion in an outer circumferential portion of the second barrel member, wherein the first barrel member has (a) a flange portion extending outward in a radial direction of the first barrel member and (b) overhang portions and bayonet protrusion portions in plural areas of the flange portion in the circumferential direction, wherein each of the overhang portions extends along an outer circumferential surface of the second barrel member in the optical axis direction, wherein each of the bayonet protrusion portions extends inward in the radial direction and engages the bayonet engagement portion of the second barrel member, wherein the first barrel member has, on an outer circumferential surface of the first barrel member, a first receiving portion and a second receiving portion separated from each other in the optical axis direction, wherein each of the first and second receiving portions protrudes from the outer circumferential surface of the first barrel member in the radial direction and is configured to make contact with an inner circumferential surface of the second barrel member, and wherein the second receiving portion is disposed in an area on the outer circumferential surface of the first barrel member overlapping the overhang portion in the radial direction.

* * * * *